United States Patent [19]

Hill

[11] 4,192,542
[45] Mar. 11, 1980

[54] AIR CONDITIONER MOUNTING ASSEMBLY FOR A CAMPING TRAILER

[75] Inventor: Max L. Hill, Listie, Pa.

[73] Assignee: The Coleman Company, Inc., Wichita, Kans.

[21] Appl. No.: 914,377

[22] Filed: Jun. 12, 1978

[51] Int. Cl.² ............................................. B60H 1/00
[52] U.S. Cl. .................................................... 296/173
[58] Field of Search ................ 296/23 R, 23 F, 23 G, 296/24 R, 37.1

[56] References Cited
U.S. PATENT DOCUMENTS

| | | | |
|---|---|---|---|
| 3,402,960 | 9/1968 | Erke | 296/23 R |
| 3,738,699 | 6/1973 | Fain | 296/23 R |

*Primary Examiner*—Richard A. Bertsch

[57] ABSTRACT

An air conditioner mounting assembly for a camping trailer supports an air conditioner after it is inserted through an opening in the canvas side panel of the camping trailer. The mounting assembly includes a pair of upright frame members which extend between the side wall of the camping trailer and the raised top and a pair of cross members which extend between the upright members to form a rectangular opening. The canvas side panel has a window flap which can be unfastened to provide a window or opening adjacent the opening in the frame. An air conditioner is inserted through the openings in the canvas and the frame, and the air conditioner is supported by the lower cross member. A strap on the upper cross member is wrapped around the handle of the air conditioner and fastened to the top of the camping trailer to prevent the air conditioner from tilting.

9 Claims, 7 Drawing Figures

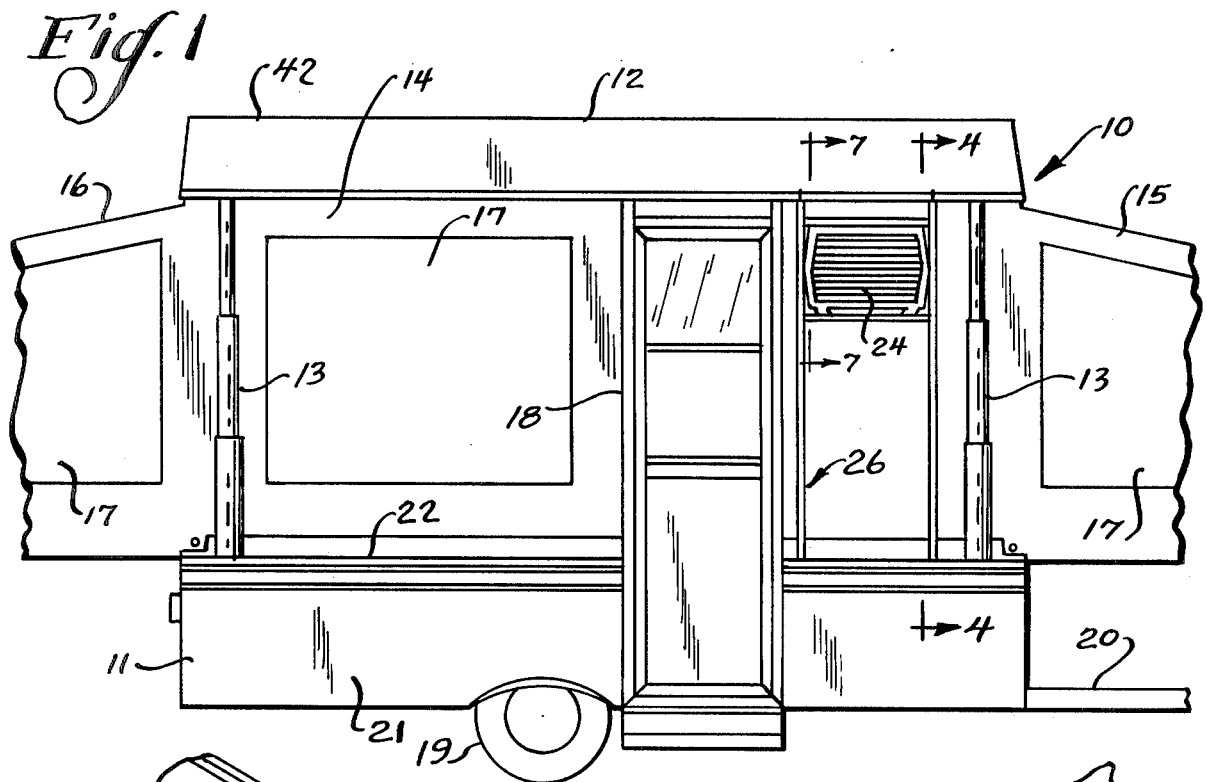
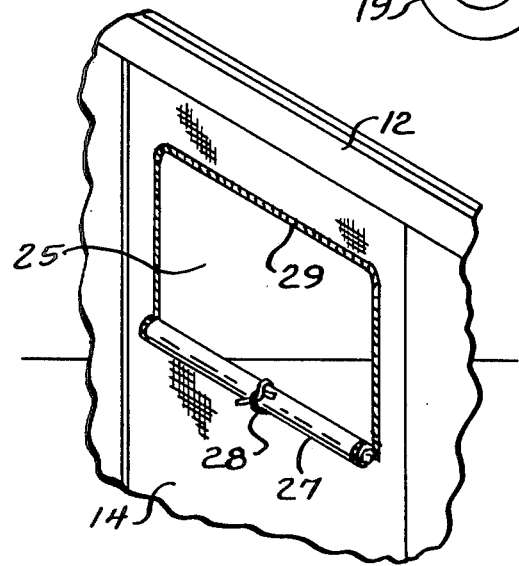
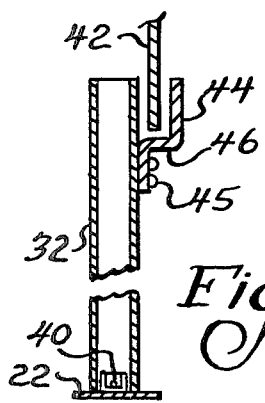
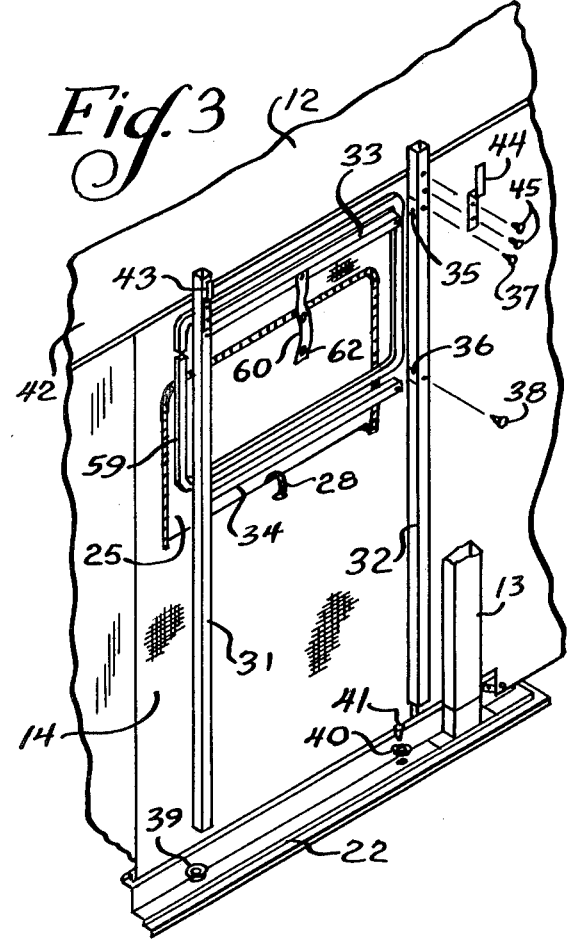

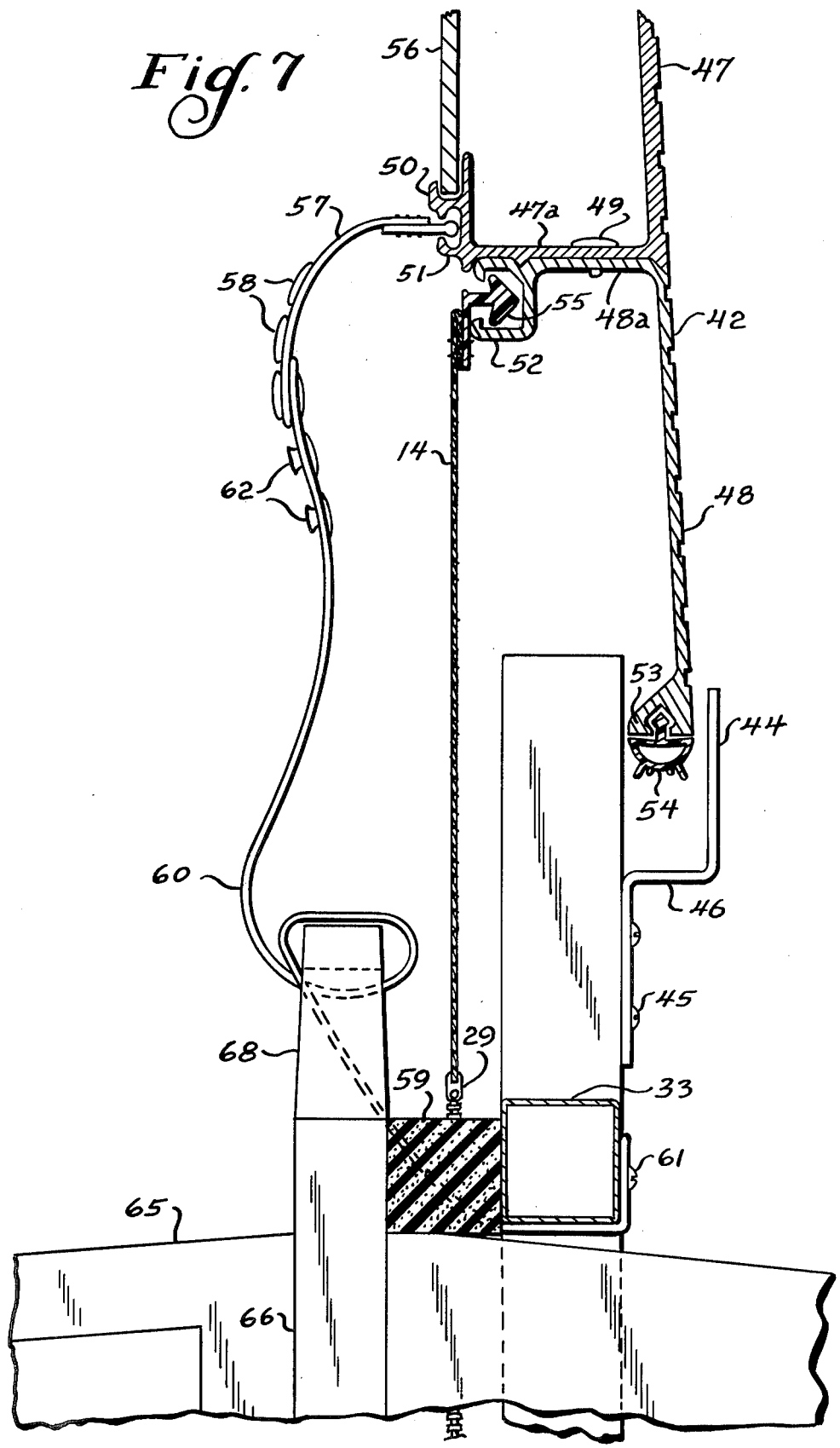

AIR CONDITIONER MOUNTING ASSEMBLY FOR A CAMPING TRAILER

BACKGROUND AND SUMMARY

Some camping trailer users want the option of using an air conditioner to cool the interior of the trailer. However, the construction of a conventional camping trailer does not readily lend itself to the installation of an air conditioner.

Camping trailers typically include a base with an upstanding permanent side wall and a top which covers the base when the camping trailer is not being used. When the camping trailer is to be used, the top is raised above the base and is supported by telescoping posts or the like. A canvas sheet extends between the raised top and the base to enclose the interior of the trailer. Some camping trailer users prefer a camping trailer which has a low profile when the top is lowered, i.e., the permanent side wall of the trailer is low so that the overall height of the collapsed camping trailer is low. However, the low side wall also makes it difficult to mount an air conditioner in the side wall.

Larger vehicles such as travel trailers and motor homes frequently have an air conditioner mounted on the rooftop of the vehicle. This is not practical for a camping trailer because the weight of available rooftop air conditioners may be excessive for the mechanism which raises and lowers the top of the camping trailer.

The invention permits a portable window air conditioner to be installed in an opening in the canvas of the camping trailer after the top is raised. A window flap which is connected to the canvas by a zipper or the like is unfastened to provide a window for the air conditioner. A supporting frame is installed between the base and the top, and the frame includes a pair of upright members and a pair of cross members which provide an opening adjacent the window in the canvas. The air conditioner may be inserted through the openings in the canvas and the frame, and the air conditioner is supported by the lower cross member. The air conditioner is stabilized and prevented from tilting by a strap on the upper cross member which is wrapped around the handle of the air conditioner and fastened to the top of the camping trailer.

DESCRIPTION OF THE DRAWING

The invention will be explained in conjunction with an illustrative embodiment shown in the accompanying drawing, in which—

FIG. 1 is a side elevational view, partially broken away, of a camping trailer equipped with an air conditioner mounting assembly formed in accordance with the invention;

FIG. 2 is a fragmentary perspective view from the inside of the camping trailer showing the window flap unzipped, rolled, and tied;

FIG. 3 is a fragmentary exploded perspective view of the mounting assembly;

FIG. 4 is a fragmentary sectional view taken along the line 4—4 of FIG. 1;

FIG. 7 is a sectional view taken along the line 7—7 of FIG. 1.

DESCRIPTION OF SPECIFIC EMBODIMENT

Figure 5:
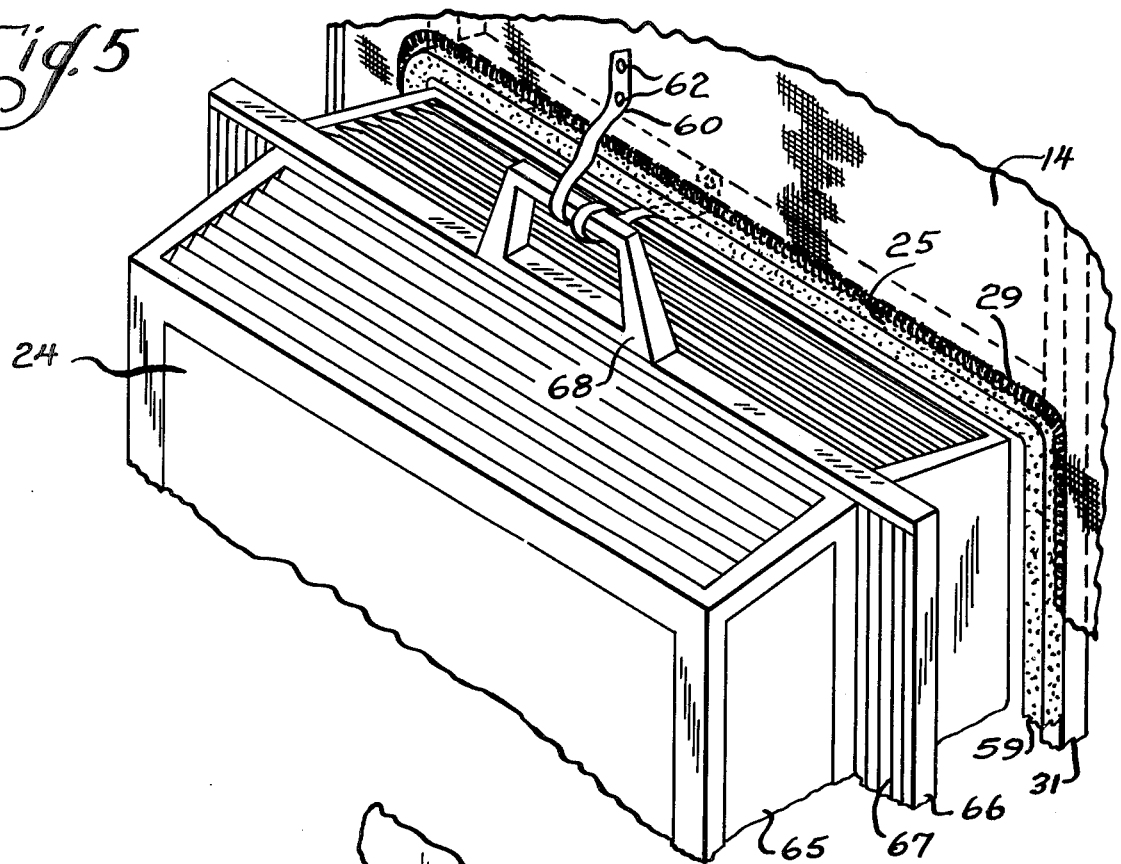
FIG. 5 is a fragmentary perspective view from the inside of the camping trailer showing the air conditioner being installed.

Referring first to FIG. 1, the numeral 10 designates generally a conventional camping trailer. The camping trailer includes a rectangular base 11, a top 12 which is supported above the base by four telescoping corner posts 13, and a canvas sheet 14 which is attached to the top and the base and forms the side panels of the camping trailer. The particular camping trailer illustrated also includes bed wings 15 and 16 which extend from the front and rear of the trailer and which enclose cantilevered bunks. The canvas is provided with window openings 17 which are covered with mesh, and an opening for a door frame 18.

The base is supported by a pair of wheels 19, and a trailer hitch 20 extends from the front of the trailer for attachment to a vehicle. The base 11 includes an upstanding side wall 21, and a rail 22 (see also FIG. 3) is mounted on the upper edge of the side wall. The corner posts 13 are attached to the rails on the sides of the trailer.

A conventional portable window air conditioner 24 is supported in an opening 25 (see FIGS. 2 and 3) in the canvas by a mounting assembly 26. Referring first to FIG. 2, which is a view from inside the trailer, the window or opening 25 is provided by a flap 27 of the canvas which is rolled down and tied by ties 28. The flap is generally rectangular and corresponds generally to the cross sectional area of the air conditioner. The lower edge of the flap remains secured to the canvas, and a zipper 29 extends around the other three edges of the flap and the opening so that the opening can be closed when desired. Other fastening means such as snaps and the like can also be used.

Turning now to FIG. 3, the mounting assembly 26 includes a frame which is formed by a pair of vertically extending upright tubular members 31 and 32 and a pair of horizontally extending tubular cross members 33 and 34. Each of the tubular members is rectangular in cross section, and a pair of openings 35 and 36 is formed in one side of each of the upright tubes. The cross tubes are inserted into the openings and secured by screws 37 and 38.

The lower ends of the upright tubes are inserted over a pair of annular buttons or projections 39 and 40 which are secured to the rail 22 of the side wall of the base by screws 41. The upper ends of the upright tubes are positioned along the inside of the downwardly extending perimetric side flange 42 of the top 12 of the trailer (see also FIGS. 4 and 7). The upright tubes and cross tubes are shown in FIG. 3 before they are connected together and mounted on the trailer. After the tubes are connected, the upper ends of the upright tubes are inserted into the space between the canvas and side flange of the top, and the tubes are then moved downwardly over the buttons 39 and 40 on the rail. The upper ends of the upright tubes are prevented from moving laterally inwardly by a pair of generally Z-shaped brackets 43 and 44 which are secured to the upper ends of the upright tubes by screws 45. The frame is thereby secured against lateral movement in any direction. The buttons 39 and 40, which are received rather snugly in the lower ends of the upright tubes, prevent the frame from moving in the longitudinal direction of the rail 22; the buttons and the brackets 43 and 44 prevent the frame from moving toward the interior of the camping trailer; and the buttons and the upper ends of the upright tubes prevent the frame from moving away from the interior of the camping trailer. In the embodiment illustrated the intermediate or offset portions 46 of the brackets (see FIG. 4) are spaced far enough below the lower edge of the side flange 42 of the top to permit the frame to be raised sufficiently to clear the buttons 39 and 40 without removing the brackets.

Referring to FIG. 7, the side flange 42 of the top includes an upper portion 47 and a lower portion 48, each of which has a laterally inwardly extending portion 47a and 48a, respectively, which are joined by rivets 49. The upper laterally inwardly extending portion is provided with a pair of channels 50 and 51, and the lower laterally inwardly extending portion is provided with channel 52. The lower edge of the lower portion 49 terminates in a channel 53. The upper and lower portions 47 and 48 can advantageously be formed of aluminum so that the channels 50–53 can be extruded.

A gasket 54 is snapped into the channel 53, and the canvas side panel 14 is attached to a deformable and resilient fastening strip 55 which is snapped into the channel 52. The top includes an inside wall 56 which is spaced inwardly from the side flange 42 and which is inserted into the channel 50. A nylon strap 57 is attached to an end portion 48 having a deformable and resilient head which is snapped into the channel 51. The strap is provided with a plurality of snap fasteners 58.

A resilient rectangular gasket 59 (FIG. 3) is attached to the frame around the rectangular opening formed by the upright tubes 31 and 32 and the cross tubes 33 and 34. The gasket may be formed of foam rubber or plastic and may be secured to the frame members by adhesive or the like. The window opening 25 in the canvas sheet 14 is slightly larger than the periphery of the gasket, and the gasket extends through the window opening into the interior of the trailer.

Referring to FIGS. 3 and 7, one end of a nylon strap 60 is attached to the upper cross tube 33 by a screw 61. The other end of the strap carries one or more snap fasteners 62 which are adapted to cooperate with the fasteners 58 on the strap 57.

Figure 6:
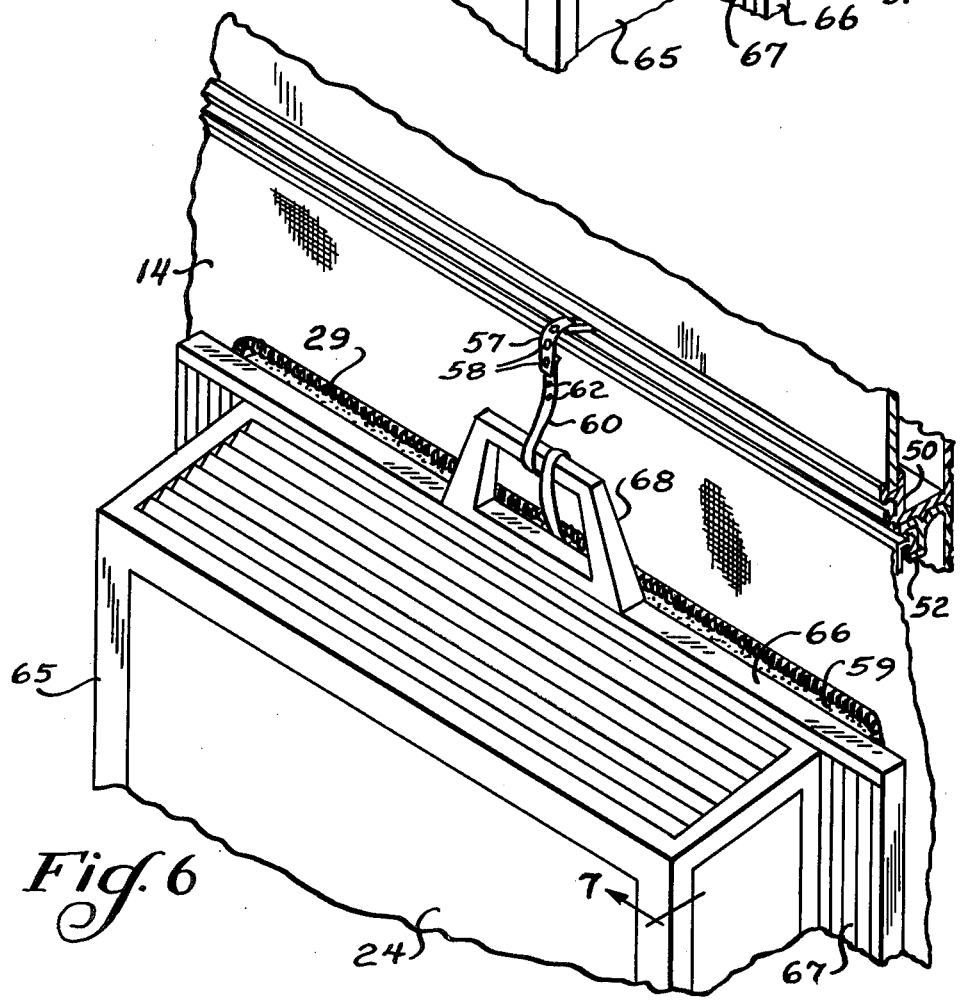
FIG. 6 is a fragmentary perspective view from the inside of the camping trailer showing the installed air conditioner.

After the mounting assembly 26 is mounted on the camping trailer, a conventional portable window air conditioner 24 is inserted through the rectangular openings in the canvas and the frame from the inside of the trailer. The air conditioner includes a box-like casing 65 (FIGS. 5–7) which has a rectangular cross section and a perimetric flange 66 which extends around the midportion of the casing. The flange would ordinarily be positioned against the bottom of a raised window and the windowsill of a room, and the particular air conditioner illustrated includes a pair of laterally extendible accordion-pleated panels 67 which are supported by the flange and which can be pulled laterally outwardly to abut the window sash. A carrying handle 68 extends upwardly from the flange 66.

The opening in the frame is sized to correspond with the cross section of the air conditioner. When the air conditioner is inserted into the opening, the flange 66 will engage the resilient gasket 59 on the frame and will seal the opening. Most of the weight of the air conditioner is supported by the lower cross tube 34 of the frame, and the air conditioner is stabilized against tipping and is maintained within the opening by the nylon straps 57 and 60. As the air conditioner is inserted into the opening, the strap 60 is pulled through the opening and passed through the handle 68 of the air conditioner.

After the flange 66 of the air conditioner is pressed against the resilient gasket, the strap is wrapped at least once around the handle and pulled tightly. One of the snap fasteners 62 on the strap is then secured to one of the snap fasteners 58 on the strap 57 to hold the straps taut. As can be seen in FIG. 7, which is a sectional view taken along a line spaced from the strap 60, the strap 60 will compress the gasket 59 and will extend substantially straight from the edge of the cross tube 33 to the handle of the air conditioner.

The cross tube 34 will support the air conditioner slightly outwardly of the middle of the air conditioner. However, the air conditioner is prevented from rotating counterclockwise about the cross tube by the straps 57 and 60 which maintain the handle 68 of the air conditioner in the proper position so that the flange 66 of the air conditioner will press against the gasket 59. The straps 57 and 60 are pulled tightly before they are fastened, and there is therefore substantially no slack in the straps which will permit tilting or rotation of the air conditioner. Since the straps are required to support some of the weight of the air conditioner, i.e., the moment caused by the center of gravity of the air conditioner being offset from the cross tube 34, the straps are preferably made from a relatively strong and inelastic material such as nylon.

The supporting assembly can be quickly erected and disassembled whenever the camping trailer is set up and collapsed. The cross tubes 33 and 34 need not be disconnected from the upright tubes 31 and 32, and the entire frame can be stored inside of the trailer.

If the air conditioner is not being used, the window flap 27 (FIG. 2) can be unrolled and secured in the window opening by the zipper 29. The support assembly does not have to be removed in order to close the window flap.

In the specific embodiment illustrated, the strap 60 was wrapped around the handle 68 of the air conditioner. However, if an air conditioner is used which does not have a handle, the strap can be wrapped around or passed through some other portion of the air conditioner. All that is required is that the strap hold the air conditioner in the proper position and prevent the air conditioner from tilting about the lower cross tube 34.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. An air conditioner mounting assembly for a camping trailer, the camping trailer having a side wall, a top above the side wall, and a canvas sheet extending between the top and the side wall, the canvas having an opening therein through which an air conditioner can extend, the mounting assembly comprising a generally vertically extending frame supported by the side wall and extending upwardly to the top, the frame including a pair of horizontally extending vertically spaced upper and lower cross members adjacent the opening in the canvas, the lower cross member being adapted to support an air conditioner which extends through the opening in the canvas, strap means attached to the upper cross member for supporting the air conditioner when the air conditioner extends between the upper and lower cross members, and strap-attaching means on the top for attachment to the strap means after the strap means is wrapped about a portion of the air conditioner.

2. The mounting assembly of claim 1 including a resilient gasket attached to the frame and extending around the periphery of the opening in the canvas.

3. The mounting assembly of claim 1 in which the canvas sheet includes a flap for closing the opening.

4. An air conditioner mounting assembly for a camping trailer, the camping trailer having a side wall, a top above the side wall, and a canvas sheet extending between the top and the side wall, the canvas having an opening therein through which an air conditioner can extend, the mounting assembly comprising a generally vertically extending frame supported by the side wall and extending upwardly to the top, the frame including a pair of horizontally extending vertically spaced upper and lower cross members adjacent the opening in the canvas and a pair of vertically extending horizontally spaced frame members which extend upwardly from the side wall to the top, the cross members extending between the vertically extending frame members and being secure thereto, the lower cross member being adapted to support an air conditioner which extends through the opening in the canvas, and strap means attached to the upper cross member for supporting the air conditioner when the air conditioner extends between the upper and lower cross members.

5. The mounting assembly of claim 4 including strap-attaching means on the top for attachment to the strap means after the strap means is wrapped about a portion of the air conditioner.

6. The mounting assembly of claim 4 including a resilient gasket attached to the frame and extending around the periphery of the opening in the canvas.

7. The mounting assembly of claim 6 in which the canvas sheet includes a flap for closing the opening.

8. The mounting assembly of claim 4, including a pair of upwardly extending projections on the side wall, the bottom of each of the vertically extending frame members being hollow and being positioned over one of the projections whereby the bottoms of the vertically extending frame members are prevented from moving horizontally.

9. The mounting assembly of claim 4 in which the top includes a downwardly extending side wall and the mounting assembly includes a bracket attached to the upper end of each of the vertically extending frame members, each bracket including a lower end which is attached to a vertically extending frame member and an upper end which is offset from the lower end and spaced from the frame member, the upper end of each of the vertically extending frame members being positioned on one side of the side wall of the top and the upper end of each of the brackets being positioned on the other side of the side wall of the tope whereby the vertically extending frame members are prevented from moving in a direction perpendicular to the side wall of the top.

* * * * *

UNITED STATES PATENT AND TRADEMARK OFFICE
CERTIFICATE OF CORRECTION

PATENT NO. : 4,192,542
DATED : March 11, 1980
INVENTOR(S) : Max Lee Hill

It is certified that error appears in the above—identified patent and that said Letters Patent are hereby corrected as shown below:

Col. 6, line 26 change "tope" to --top--.

Signed and Sealed this

Eighth Day of July 1980

[SEAL]

Attest:

SIDNEY A. DIAMOND

Attesting Officer     Commissioner of Patents and Trademarks